United States Patent
Schneider

(10) Patent No.: US 10,494,077 B2
(45) Date of Patent: Dec. 3, 2019

(54) DECOMPRESSION ASSEMBLY WITH TWO DECOMPRESSION OPENINGS

(71) Applicant: Airbus Operations GmbH, Hamburg (DE)

(72) Inventor: Uwe Schneider, Hamburg (DE)

(73) Assignee: AIRBUS OPERATIONS GMBH, Hamburg (DE)

(*) Notice: Subject to any disclaimer, the term of this patent is extended or adjusted under 35 U.S.C. 154(b) by 525 days.

(21) Appl. No.: 15/349,254

(22) Filed: Nov. 11, 2016

(65) Prior Publication Data

US 2017/0144744 A1   May 25, 2017

(30) Foreign Application Priority Data

Nov. 20, 2015 (EP) .................................. 15195570
Nov. 20, 2015 (EP) .................................. 15195571

(51) Int. Cl.
*B64C 1/14* (2006.01)
*B64C 1/06* (2006.01)
(Continued)

(52) U.S. Cl.
CPC ................ *B64C 1/14* (2013.01); *B64C 1/066* (2013.01); *B64C 1/18* (2013.01); *B64D 13/04* (2013.01); *B64C 2001/009* (2013.01)

(58) Field of Classification Search
CPC .. B64C 1/14; B64C 1/066; B64C 1/18; B64C 2001/009; B64D 13/04
See application file for complete search history.

(56) References Cited

U.S. PATENT DOCUMENTS

| 8,955,803 B2 | 2/2015 | Voss et al. |
| 9,022,321 B2 | 5/2015 | Vogt et al. |

(Continued)

FOREIGN PATENT DOCUMENTS

| DE | 102009012015 | 9/2010 |
| DE | 102011011976 | 11/2013 |
| EP | 2403756 | 1/2012 |

OTHER PUBLICATIONS

European Search Report, dated Feb. 26, 2016, priority document EP15195571.3.

*Primary Examiner* — Rodney A Bonnette
(74) *Attorney, Agent, or Firm* — Greer, Burns & Crain, Ltd.

(57) ABSTRACT

An aircraft decompression assembly, comprising a cabin lining element, an element opening and an air channel adjacent to an element rear face and connected to the opening. A channel outlet, during normal assembly operation, discharges air exiting a cabin region delimited by the element through the opening into a secluded area between the element and an aircraft outer skin. A first decompression opening has a first decompression flap, which during normal operation, closes the first decompression opening and, in the event of a rapid decompression, opens the first decompression opening equalizing a pressure between the cabin region and the secluded area. A second decompression opening in the lining element has a second decompression flap which, during normal operation, closes the second decompression opening and which, in the event of a rapid decompression, opens the second decompression opening equalizing a pressure between the cabin region and the secluded area.

15 Claims, 8 Drawing Sheets

(51) Int. Cl.
*B64C 1/18* (2006.01)
*B64D 13/04* (2006.01)
*B64C 1/00* (2006.01)

(56) References Cited

U.S. PATENT DOCUMENTS

| | | | |
|---|---|---|---|
| 2003/0160130 A1* | 8/2003 | Novak | B64C 1/1423 244/129.5 |
| 2003/0222175 A1* | 12/2003 | Movsesian | B64C 1/1469 244/118.5 |
| 2005/0224649 A1* | 10/2005 | Tomiyama | B64C 1/1469 244/118.5 |
| 2010/0320318 A1 | 12/2010 | Roth et al. | |
| 2012/0043421 A1 | 2/2012 | Voss et al. | |
| 2012/0214393 A1 | 8/2012 | Vogt et al. | |
| 2018/0127100 A1* | 5/2018 | Roth | B64C 1/18 |

* cited by examiner

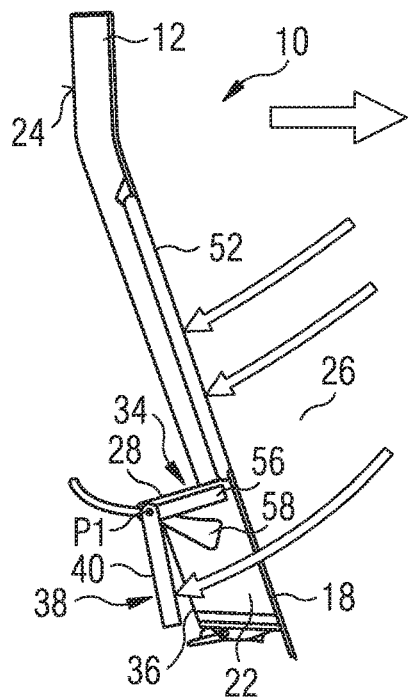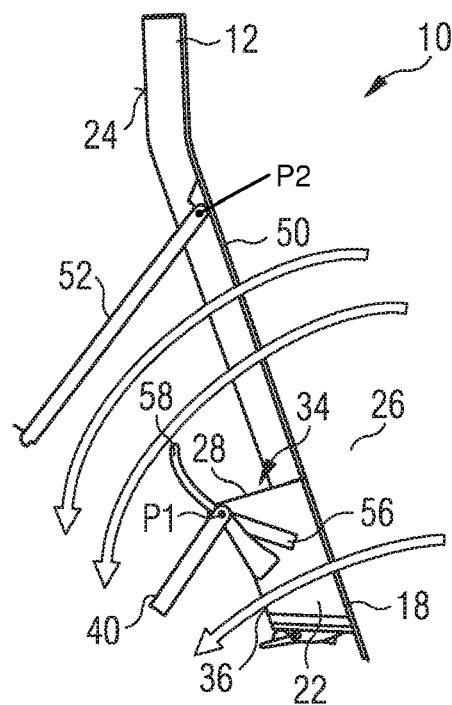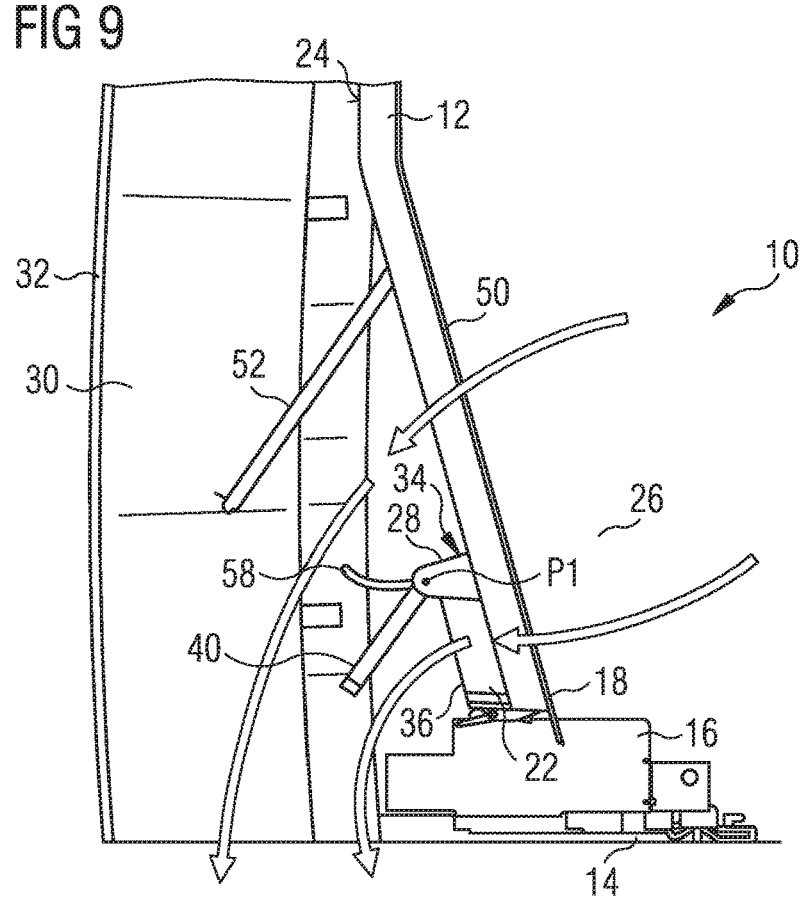

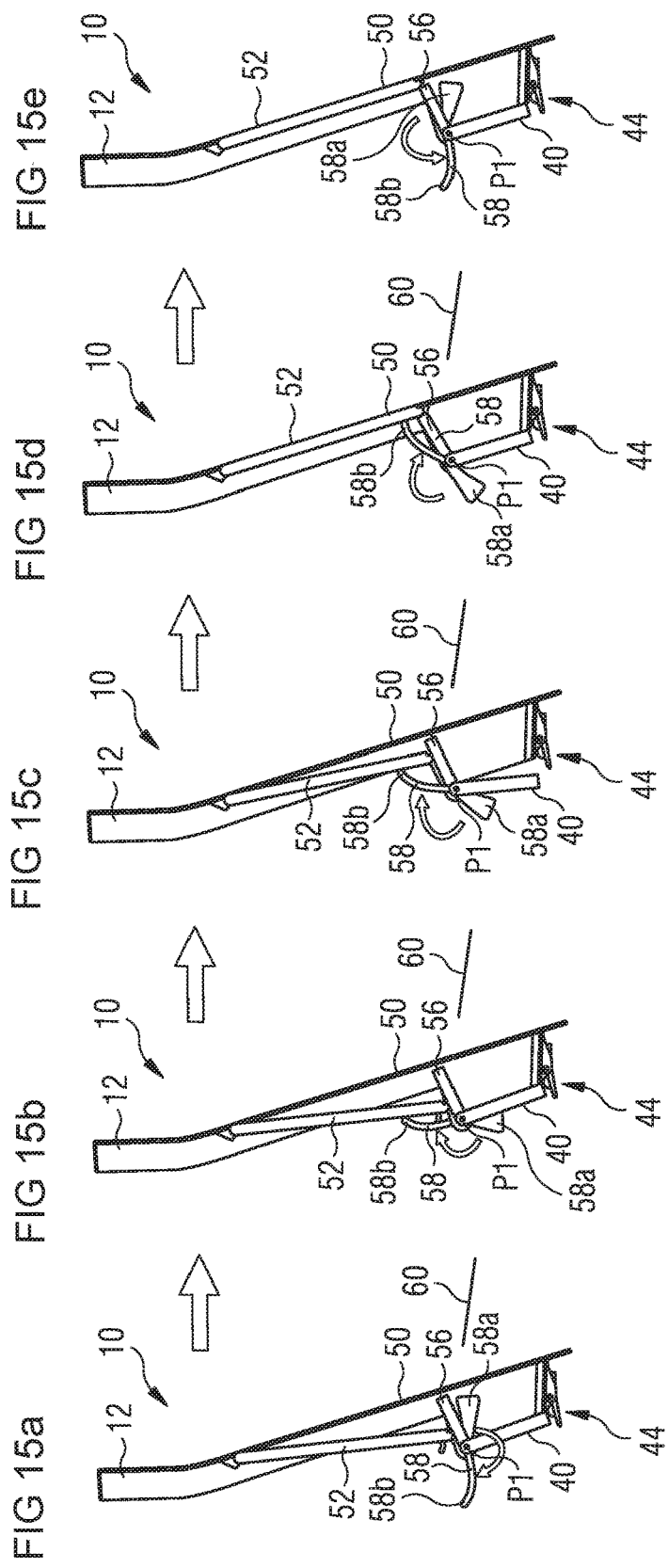

DECOMPRESSION ASSEMBLY WITH TWO DECOMPRESSION OPENINGS

CROSS-REFERENCES TO RELATED APPLICATIONS

This application claims the benefit of the European patent application No. 15 195 571.3 filed on Nov. 20, 2015, and of the European patent application No. 15 195 570.5 filed on Nov. 20, 2015, the entire disclosures of which are incorporated herein by way of reference.

BACKGROUND OF THE INVENTION

The invention relates to a decompression assembly for use in an aircraft, for example a passenger aircraft. Furthermore, the invention relates to an aircraft which is equipped with a decompression assembly of this kind.

Passenger aircraft currently in use comprise a pressurized cabin, the internal pressure of which, during flight operation of the aircraft, is maintained, for example, by means of an air conditioning system, at a pressure level that is increased compared to the ambient pressure, i.e., the reduced atmospheric pressure at high altitudes. The pressure in the interior of the cabin of a passenger aircraft while the aircraft is flying at cruising altitude usually corresponds approximately to the atmospheric pressure at an altitude of 8000 ft. (ca. 2400 m). The conditioning air supplied by the aircraft air conditioning system is conventionally fed into the cabin through air inlet ducts, which open out into the cabin above the passenger seats in the region of ceiling lining panels and/or side lining panels of the cabin lining. The exhaust air from the cabin usually is discharged through air outlet ducts, which are disposed in the region of a cabin floor or a portion of the side lining panels that is situated near the floor. In order to avoid damage to the cabin lining, in particular to the side lining panels, in the event of a decompression, i.e., in the event of a pressure drop in a region of the aircraft cabin which is kept at an increased pressure during flight, a mutual pressure equalization between an inner region of the aircraft cabin which is delimited by the side lining panels of the cabin lining and a region of the aircraft lying between the side lining panels of the cabin lining and the aircraft outer skin must be possible.

DE 10 2009 012 015 A1, EP 2 403 756 A1 and U.S. Pat. No. 8,955,803 B2 describe a dado panel with an integrated flap mechanism which, in the event of a sudden pressure drop in an aircraft region lying between the side lining panels of the cabin lining and the aircraft outer skin, opens a pressure equalizing opening, through which air can flow out of the inner region of the aircraft cabin delimited by the side lining panels into the aircraft region between the side lining panels and the aircraft outer skin, which is affected by the decompression. In the event of a decompression in the inner region of the aircraft cabin delimited by the side lining panels, an air outlet duct which, during normal operation of the aircraft, serves to discharge exhaust air from the interior of the cabin into the region of the aircraft lying between the side lining panels and the aircraft outer skin, is utilized to lead air out of the region of the aircraft lying between the side lining panels and the aircraft outer skin into the inner region of the aircraft cabin affected by the sudden pressure drop in order to allow a pressure equalization.

DE 10 2011 011 976 B4 and U.S. Pat. No. 9,022,321 B2 disclose a decompression arrangement comprising a first cabin lining element that extends, in at least some sections, substantially parallel with an aircraft outer skin and includes a lower edge region provided at a distance from a floor of the aircraft, wherein the first cabin lining element extends from the lower edge region generally upwardly in a direction of a ceiling of the aircraft. A second cabin lining element is positioned between the first cabin lining element and the aircraft outer skin, wherein the second cabin lining element includes an upper edge region positioned between the lower edge region of the first cabin lining element and the aircraft outer skin. The second cabin lining element extends downwardly from the upper edge region in a direction of the floor of the aircraft. An air discharge opening is arranged between the lower edge region of the first cabin lining element and the upper edge region of the second cabin lining element and is adapted, in the normal operation of the aircraft, to discharge air from the inner region of the cabin into a region of the aircraft lying between the first and second cabin lining elements and the aircraft outer skin.

A decompression element is integrated in the second cabin lining element and has a flap which, in a closed position, closes a pressure equalizing opening formed in the decompression element. The flap is configured to, if a first predetermined differential pressure acts on the decompression element, pivot about an axis in a first direction from the closed position into a first open position, wherein in the first open position the flap opens the pressure equalizing opening formed in the decompression element. Further, the flap is configured to, if a second predetermined differential pressure acts on the decompression element, pivot about the axis in a second direction opposite the first direction into a second open position, wherein in the second open position the flap opens the pressure equalizing opening formed in the decompression element. The decompression element is positioned relative to the first and the second cabin lining elements in such a manner that the flap in its second open position keeps clear a through-flow cross-section of the air discharge opening.

SUMMARY OF THE INVENTION

The invention is directed at an object of providing a space optimized decompression assembly. Further, the invention is directed at an object of providing an aircraft which is equipped with a decompression assembly of this kind.

A decompression assembly for use in an aircraft comprises a cabin lining element. The cabin lining element may be a decorative lining element which extends in the region of a side wall of an aircraft passenger cabin, in particular, close to a passenger cabin floor. An opening is formed in the cabin lining element. Basically, the cabin lining element may be provided with only one opening. It is, however, also conceivable that multiple openings are formed in the cabin lining element.

The decompression assembly further comprises an air channel which is arranged adjacent to a rear face of the cabin lining element. The term "rear face" in this context designates a face of the cabin lining element which, when the cabin lining element is installed in an aircraft cabin, faces away from the interior of the aircraft cabin, i.e., faces an inner face of an aircraft outer skin. The air channel is connected to the opening formed in the cabin lining element. Thus, when the cabin lining element is installed in an aircraft cabin, the opening formed in the cabin lining element allows an air exchange between the aircraft cabin and the air channel. The air channel may extend adjacent to the rear face of the cabin lining element, i.e., when viewed from an interior of the aircraft cabin, behind the cabin lining element substantially parallel to a longitudinal axis of the aircraft cabin.

The air channel is provided with an air outlet which, during normal operation of the decompression assembly, is adapted to discharge air exiting an aircraft cabin region delimited by the cabin lining element through the opening formed in the cabin lining element into an aircraft area located between the cabin lining element and an aircraft outer skin. Thus, during normal operation of the decompression assembly, cabin exhaust air may be guided from the aircraft cabin region delimited by the cabin lining element via the opening formed in the cabin lining element, the air channel and the area outlet of the air channel into the aircraft area located between the cabin lining element and the aircraft outer skin. From the aircraft area located between the cabin lining element and the aircraft outer skin, the cabin exhaust air may be directed into a mixing chamber of an aircraft air-conditioning system so as to be recirculated into aircraft cabin or may be discharged overboard, for example via an air outlet valve.

The air channel of the decompression assembly further comprises a first decompression opening. A first decompression flap is present which, during normal operation of the decompression assembly, is adapted to close the first decompression opening provided in the air channel. Thus, during normal operation of the decompression assembly, air entering the air channel via the opening provided in the cabin lining element exits the air channel exclusively via the air outlet. The first decompression flap, in the event of a rapid decompression, is adapted to open the first decompression opening so as to allow a pressure equalization between the aircraft cabin region delimited by the cabin lining element and the aircraft area located between the cabin lining element and the aircraft outer skin. Thus, in the event of a sudden pressure drop, either in the aircraft cabin region delimited by the cabin lining element or in the aircraft area located between the cabin lining element and the aircraft outer skin, air may flow from the aircraft cabin region delimited by the cabin lining element into the aircraft area located between the cabin lining element and the aircraft outer skin or vice versa via the opening provided in the cabin lining element, the air channel and the first decompression opening.

The decompression assembly further comprises a second decompression opening formed in the cabin lining element. Basically, the cabin lining element may be provided with only one second decompression opening. It is, however, also conceivable that multiple second decompression openings are formed in the cabin lining element.

A second decompression flap is present which, during normal operation of the decompression assembly, is adapted to close the second decompression opening formed in the cabin lining element. Thus, during normal operation of the decompression assembly, the air outlet, in fact, is the only air flow path between the aircraft cabin region delimited by the cabin lining element and the aircraft area located between the cabin lining element and the aircraft outer skin. The second decompression flap, in the event of a rapid decompression, is adapted to open the second decompression opening so as to allow a pressure equalization between the aircraft cabin region delimited by the cabin lining element and the aircraft area located between the cabin lining element and the aircraft outer skin. Thus, in the event of a sudden pressure drop either in the aircraft cabin region delimited by the cabin lining element or in the aircraft area located between the cabin lining element and the aircraft outer skin, air may flow from the aircraft cabin region delimited by the cabin lining element into the aircraft area located between the cabin lining element and the aircraft outer skin or vice versa not only via the opening provided in the cabin lining element, the air channel and the first decompression opening, but also via the second decompression opening provided in the cabin lining element.

In the event of a rapid decompression, due to the presence of two decompression openings, the decompression assembly allows a quick and reliable pressure equalization between the aircraft cabin region delimited by the cabin lining element and the aircraft area located between the cabin lining element and the aircraft outer skin. In addition, due to the design of the decompression assembly with an air channel arranged adjacent to the rear face of the cabin lining element and a second decompression formed in the cabin lining element, the decompression assembly is particularly installation space saving. Moreover, the cabin lining element, in the region of its front face which, when the cabin lining element is installed in an aircraft cabin, faces the interior of the aircraft cabin, can be designed with a substantially flat surface without curvatures protruding into the interior of the aircraft cabin. As a result, the foot space of passengers sitting on passenger seats installed in the aircraft cabin adjacent to the cabin lining element can be increased without affecting the rapid decompression function of the decompression assembly. Finally, the first decompression flap is shielded from the interior of the aircraft cabin and hence reliably protected from misuse loads, such as for example foot treads or the like.

In a preferred embodiment of the decompression assembly, the air outlet is formed in a first wall of the air channel. Preferably, the first wall has a first edge which faces the rear face of the cabin lining element and a second edge which faces away from the rear face of the cabin lining element. The first wall of the air channel thus may protrude from the rear face of the cabin lining element. In dependence on the installation requirements and the available installation space, the first wall of the air channel may, for example, extend at an angle of approximately 80 to 100° relative to the rear face of the cabin lining element. Specifically, the first wall of the air channel may extend substantially perpendicular from the rear face of the cabin lining element.

The opening formed in the cabin lining element may be covered by an air permeable grid. Preferably, the grid is designed in such a manner that it does not affect an air flow through the opening formed in the cabin lining element, but protects sensitive components of the decompression assembly such as, for example, the first decompression flap. For example, the grid may be made of a metal or plastic material which has a strength that is sufficient to withstand misuse loads, such as, for example, foot treads. Alternatively or additionally thereto, the air outlet formed in the air channel may be covered by an air permeable grid. The grid preferably is designed in such a manner that it does not affect the cabin exhaust air flow through the air outlet, but prevents dirt and dust particles from entering the aircraft area located between the cabin lining element and the aircraft outer skin.

The first decompression opening may be formed in a second wall of the air channel which extends at a distance from the rear face of the cabin lining element opposed to the opening formed in the cabin lining element. In dependence on the installation requirements and the available installation space, the second wall of the air channel may, for example, extend at a distance from the rear face of the cabin lining element and at an angle of approximately −10 to 10° relative to the rear face of the cabin lining element.

Preferably, the first decompression flap is pivotable about a first pivot axis. In the event of a rapid decompression, the first decompression flap may be adapted to pivot around the first pivot axis in a direction away from the rear face of the cabin lining element so as to allow an airflow from the air channel through the first decompression opening into the aircraft area located between the cabin lining element and the aircraft outer skin. Thus, in the event of a sudden pressure drop in the aircraft area located between the cabin lining element and the aircraft outer skin, air from the aircraft cabin region delimited by the cabin lining element may flow through the opening formed in the cabin lining element into the air channel and further through the first decompression opening into the aircraft area located between the cabin lining element and the aircraft outer skin. As a result, a pressure equalization between the aircraft cabin region delimited by the cabin lining element and the aircraft area located between the cabin lining element and the aircraft outer skin is made possible.

The first pivot axis of the first decompression flap may be arranged along an edge of the first decompression flap which faces the air outlet. In particular, the first pivot axis of the first decompression flap may extend along an edge of the first decompression flap which faces the second edge of the first wall of the air channel.

The first decompression flap may be biased into its closed position by means of a spring mechanism. The spring mechanism may, for example, comprise a spring element or another elastic element which is suitable to apply a biasing force to the first decompression flap. The biasing force provided by the spring mechanism may be controlled as desired by a suitable design of the spring mechanism, for example by equipping the spring mechanism with a spring element having a desired spring constant.

Alternatively or additionally thereto, the first decompression flap, during normal operation of the decompression assembly, may be locked in its closed position by means of a first locking mechanism. The first locking mechanism may comprise at least one locking element which is adapted to interact with the first decompression flap, in particular an edge of the first decompression flap, so as to lock the first decompression flap in its closed position during normal operation of the decompression assembly. Preferably, the first locking mechanism is designed in the form of a snap and click mechanism.

The spring mechanism may be adapted to bias the first decompression flap into its closed position until a pressure difference between the aircraft cabin region delimited by the cabin lining element and the aircraft area located between the cabin lining element and the aircraft outer skin exceeds a rapid decompression threshold value.

Thus, during normal operation of the decompression assembly, as long as the biasing force provided by the spring mechanism exceeds a pressure difference between the aircraft cabin region delimited by the cabin lining element and the aircraft area located between the cabin lining element and the aircraft outer skin, which acts on opposing surfaces of the first decompression flap, the first decompression flap is held in its closed position.

Alternatively or additionally thereto, the first locking mechanism may be adapted to lock the first decompression flap in its closed position until a pressure difference between the aircraft cabin region delimited by the cabin lining element and the aircraft area located between the cabin lining element and the aircraft outer skin exceeds a rapid decompression threshold value. Thus, during normal operation of the decompression assembly, as long as the locking force provided by the first locking mechanism exceeds a pressure difference between the aircraft cabin region delimited by the cabin lining element and the aircraft area located between the cabin lining element and the aircraft outer skin, which acts on opposing surfaces of the first decompression flap, the first decompression flap is held in its closed position.

To the contrary, as soon as the pressure difference between the aircraft cabin region delimited by the cabin lining element and the aircraft area located between the cabin lining element and the aircraft outer skin, which acts on opposing surfaces of the first decompression flap, exceeds the rapid decompression threshold value and hence the biasing force provided by the spring mechanism and/or the locking force provided by the first locking mechanism, the first decompression flap is opened against the biasing action exerted by the spring mechanism so as to allow a pressure equalization between the aircraft cabin region delimited by the cabin lining element and the aircraft area located between the cabin lining element and the aircraft outer skin.

Further, the spring mechanism may be adapted to bias the first decompression flap, after a decompression event, back into its closed position and back into engagement with the first locking mechanism as soon as a pressure difference between the aircraft cabin region delimited by the cabin lining element and the aircraft area located between the cabin lining element and the aircraft outer skin is lower than the decompression threshold value. Thus, after pressure equalization between the aircraft cabin region delimited by the cabin lining element and the aircraft area located between the cabin lining element and the aircraft outer skin, as soon as the biasing force provided by the spring mechanism exceeds a pressure difference acting on opposing surfaces of the first decompression flap, the first decompression flap again is automatically closed and locked due to the biasing force provided by the spring mechanism. Manual closing and locking of the first decompression flap after a decompression event thus is not necessary.

The second decompression opening may be formed in a region of the cabin lining element which, when the cabin lining element is mounted in an aircraft cabin, faces away from the floor of the aircraft cabin. The opening preferably is formed in a region of the cabin lining element which, when the cabin lining element is mounted in an aircraft cabin, faces the floor of the aircraft cabin. Both the second decompression opening and the opening, when the cabin lining element is mounted in the aircraft cabin, may be arranged in the region of a foot space of passengers sitting on passenger seats arranged in the aircraft cabin.

A cross-sectional area of the second decompression opening may be larger than a cross-sectional area of the first decompression opening. Correspondingly, a surface area of the second decompression flap may be larger than a surface area of the first decompression flap. Thus, the installation space required for installing the first decompression flap may be minimized so that a particularly installation space saving decompression assembly can be obtained.

The second decompression flap may be pivotable about a second pivot axis. In the event of a rapid decompression, the second decompression flap may be adapted to pivot around the second pivot axis in a direction away from the rear face of the cabin lining element so as to allow an airflow from the aircraft cabin region delimited by the cabin lining element through the second decompression opening into the aircraft area located between the cabin lining element and the aircraft outer skin. Thus, in the event of a sudden pressure drop in the aircraft area located between the cabin lining element and the aircraft outer skin, air from the aircraft cabin region delimited by the cabin lining element may flow into the aircraft area located between the cabin lining element and the aircraft outer skin not only via the opening formed in the cabin lining element, the air channel and the first decompression opening, but also via the second decompression opening formed in the cabin lining element. As a result, a particularly rapid pressure equalization between the aircraft cabin region delimited by the cabin lining element and the aircraft area located between the cabin lining element and the aircraft outer skin is made possible.

The second pivot axis of the second decompression flap may be attached to the rear face of the cabin lining element. The second decompression flap than may be mounted to the cabin lining element in a simple and installation space saving manner.

The second decompression flap, during normal operation of the decompression assembly, may be locked in its closed position by means of a second locking mechanism. The second locking mechanism may comprise at least one locking element which may be designed in the form of a locking pin and which may be adapted to interact with the second decompression flap, in particular an edge of the second decompression flap which faces the opening formed in the cabin lining element, so as to lock the second decompression flap in its closed position during normal operation of the decompression assembly.

In a preferred embodiment of the decompression assembly, at least one locking element of the second locking mechanism, which may be designed in the form of a locking pin, is attached to the first decompression flap and pivotable about the first pivot axis together with the first decompression flap. Thus, the locking element of the second locking mechanism is disengaged from the second decompression flap so as to allow a movement of the second decompression flap from its closed position into its open position as soon as the first decompression flap is disengaged from the first locking mechanism and moved from its closed position into its open position.

The second locking mechanism may further comprise a lever element which is adapted to be brought into contact with the second decompression flap, after a rapid decompression event, by a manual operation so as to move the second decompression flap back into its closed position and into engagement with the second locking mechanism. The lever element may be pivotable about the first pivot axis relative to the first decompression flap and the at least one locking element of the second locking mechanism. Further, the lever element may comprise a first portion which, after a rapid decompression event, is adapted to be contacted with a tool inserted into the air channel through the opening provided in the cabin lining element, and a second portion which, after a rapid decompression event, is adapted to push against the second decompression flap so as to move the second decompression flap back into its closed position and into engagement with the second locking mechanism. Preferably, the lever element, for example by means of a suitable spring element, is biased into a position wherein its first portion protrudes into the air channel and hence can be reached by a tool which is inserted into the air channel through the opening provided in the cabin lining element.

Basically, the cabin lining element of the decompression assembly may be any desired cabin lining element suitable for installation in an aircraft cabin. Preferably, however, the cabin lining elements is dado panel.

An aircraft may be equipped with an above-described decompression assembly.

BRIEF DESCRIPTION OF THE DRAWINGS

A preferred embodiment of a decompression assembly for use in an aircraft now will be described in greater detail with reference to the accompanying schematic drawings, wherein FIG. 9 shows a side view of the decompression assembly according to FIG. 8b, FIGS. 10 to 13 show various three-dimensional views of the decompression assembly according to FIG. 8b, FIGS. 15a to e show the manual operation of a second locking mechanism of the decompression assembly according to FIG. 14 after a rapid decompression event in order to again lock a second decompression flap of the decompression assembly in its closed position.

DETAILED DESCRIPTION OF THE PREFERRED EMBODIMENTS

Figure 12:
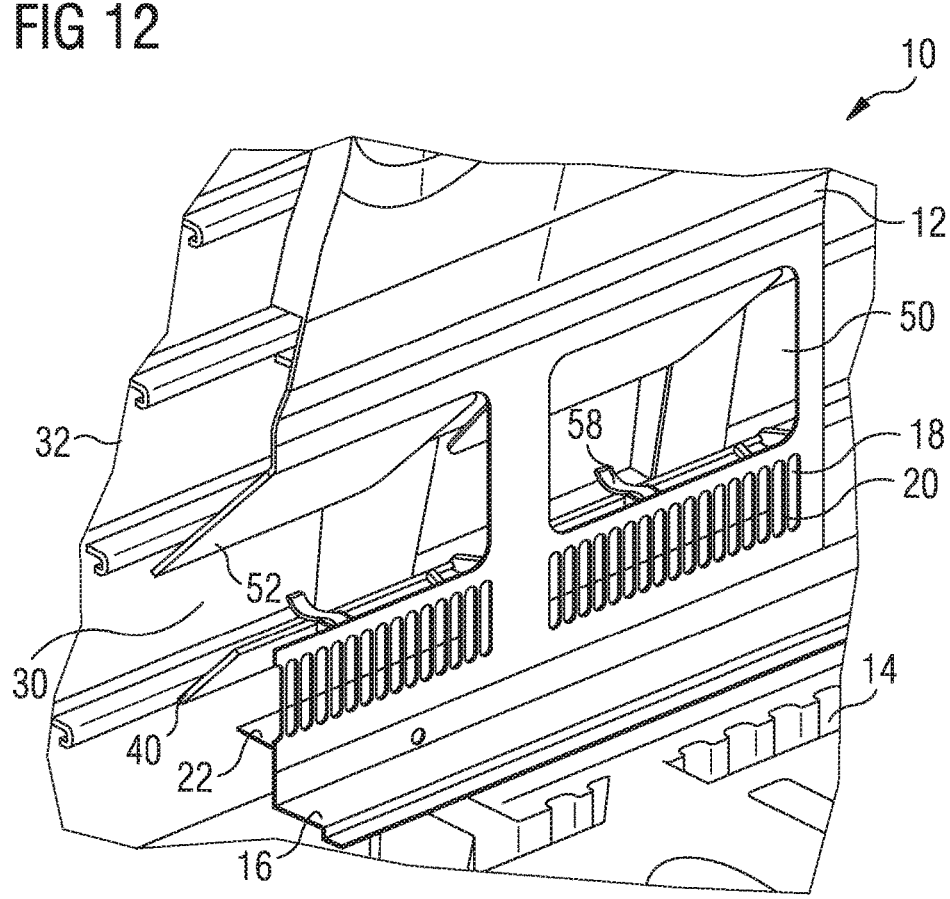
Figure 13:
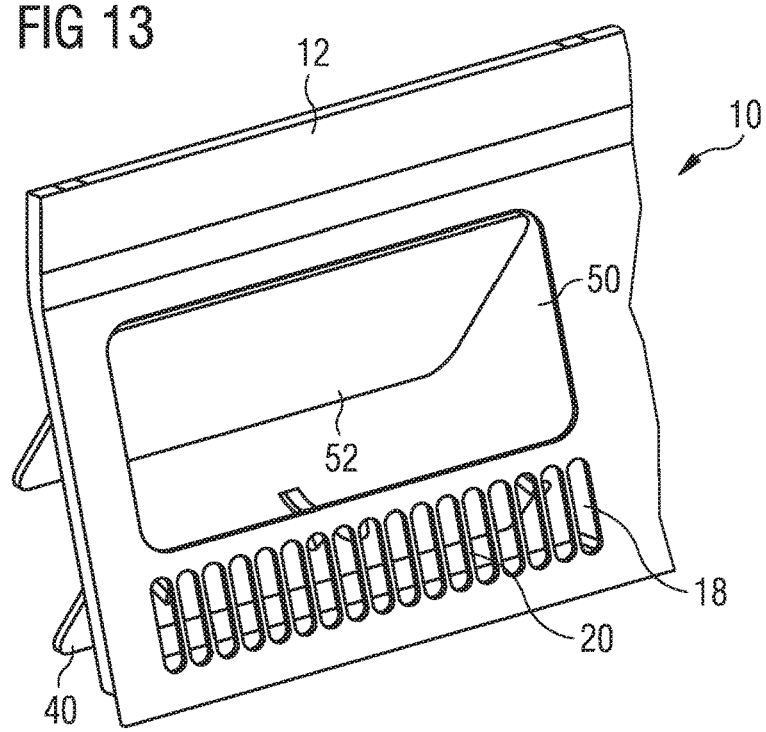

FIGS. 1 to 15 show a decompression assembly 10 for use in an aircraft, in particular a passenger aircraft. The decompression assembly 10 comprises a cabin lining element 12. In the embodiment of a decompression assembly 10 shown in the drawings, the cabin lining element 12 is designed in the form of a dado panel which constitutes a part of a sidewall lining of an aircraft cabin and is arranged adjacent to a cabin floor 14, see in particular FIG. 9. A gap between a lower edge of the cabin lining element 12 and the cabin floor 14 is closed by means of a cover element 16, see in particular FIGS. 6, 9 and 12. An opening 18 is formed in the cabin lining element 12. The opening 18 is covered by air permeable grid 20. The grid 20 protects components of the decompression assembly 10 which, when the decompression assembly 10 is viewed from an interior of the aircraft cabin, are arranged behind the cabin lining element 12 and which will be described in greater detail below from misuse loads, such as, for example, foot treads or the like.

In addition, the decompression assembly 10 comprises an air channel 22 which is arranged adjacent to a rear face 24 of the cabin lining element 12. When the decompression assembly 10 is installed in an aircraft cabin as shown in the drawings the rear face 24 of the cabin lining element 12 faces away from an interior of the aircraft cabin. The air channel 22 is connected to the opening 18 formed in the cabin lining element 12. Thus, the opening 18 establishes an air flow path between an aircraft cabin region 26 delimited by the cabin lining element 12 and the air channel 22.

Figure 3:
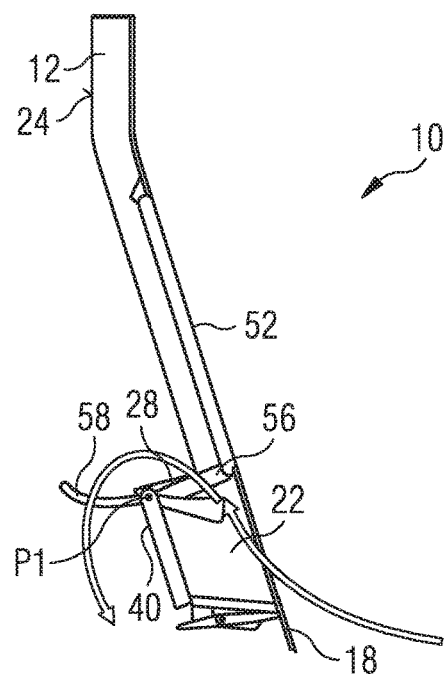
FIG. 3 shows a cross-sectional view of the decompression assembly according to FIG. 1, FIGS. 4 to 6 show various three-dimensional views of the decompression assembly according to FIG. 1.
Figure 4:
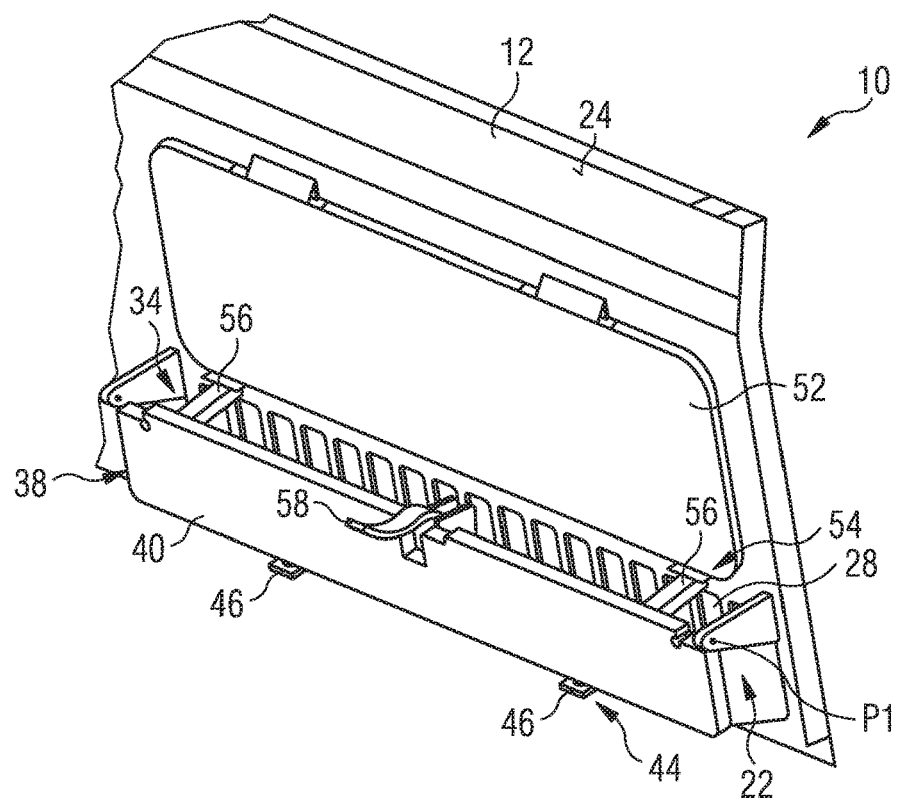
Figure 5:
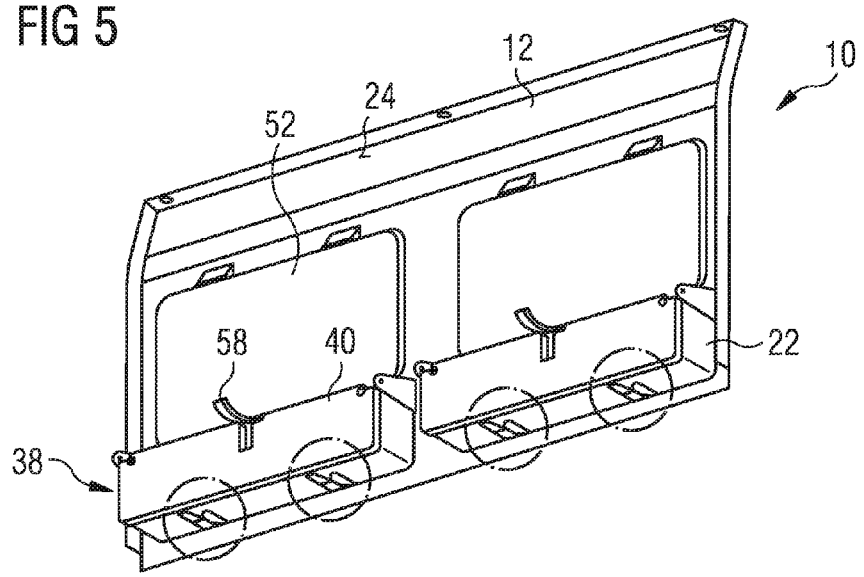

The air channel 22 comprises an air outlet 28 which, during normal operation of the decompression assembly 10, discharges air exiting the aircraft cabin region 26 delimited by the cabin lining element 12 through the opening 18 formed in the cabin lining element 12 into an aircraft area 30 which is located between the cabin lining element 12 and an aircraft outer skin 32, see in particular FIG. 3. Thus, during normal operation of the decompression assembly 10, cabin exhaust air is guided from the aircraft cabin region 26 delimited by the cabin lining element 12 via the opening 18, the air channel 22 and the area outlet 28 into the aircraft area 30 located between the cabin lining element 12 and the aircraft outer skin 32.

The air outlet 28 is formed in a first wall 34 of the air channel 22 which has a first edge facing the rear face 24 of the cabin lining element 12 and a second edge facing away from the rear face 24 of the cabin lining element 12. In the embodiment of a decompression assembly 10 shown in the drawings, the first wall 34 extends substantially perpendicular from the rear face 24 of the cabin lining element 12. Although not shown in the drawings, the outlet 28 may be covered by an air permeable grid so as to prevent dust or dirt particles from entering the aircraft area 30 located between the cabin lining element 12 and an aircraft outer skin 32.

The air channel 22 of the decompression assembly 10 further comprises a first decompression opening 36. The first decompression opening 36 is formed in a second wall 38 of the air channel 22 which extends at a distance from the rear face 24 of the cabin lining element 12 opposed to the opening 18 formed in the cabin lining element 12. In particular, the second wall 38 of the air channel 22 extends substantially parallel to a portion of the rear face 24 of the cabin lining element 12 which surrounds the opening 18.

A first decompression flap 40 is present which, during normal operation of the decompression assembly 10, closes the first decompression opening 36 provided in the air channel 22 as shown in FIGS. 1 and 3 to 7. The first decompression flap 40 is pivotable about a first pivot axis P1 which extends along an edge of the first decompression flap 40 which faces the air outlet 28, in particular the second edge of the first wall 34 of the air channel 22. A spring mechanism 42, see FIG. 2, serves to bias the first decompression flap 46 into its closed position.

Figure 6:
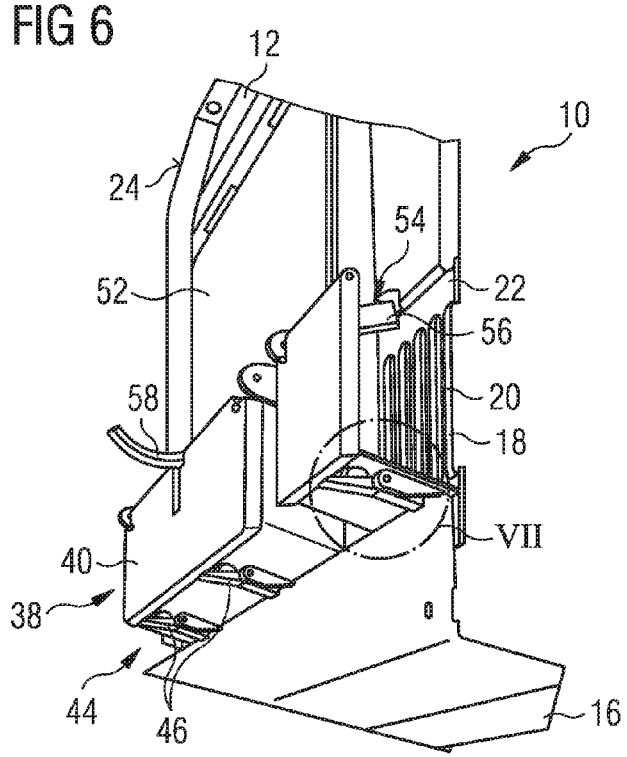
Figure 7:
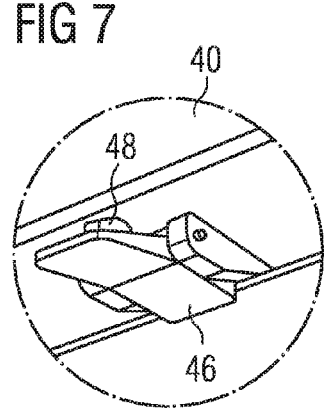
FIG. 7 shows a detail view of a first locking mechanism of the decompression assembly according to FIG. 1, FIGS. 8a and b show the decompression assembly according to FIG. 3 in the event of a rapid decompression caused by a sudden pressure drop in an aircraft area located between a cabin lining element of the decompression assembly and an aircraft outer skin.
Figure 10:
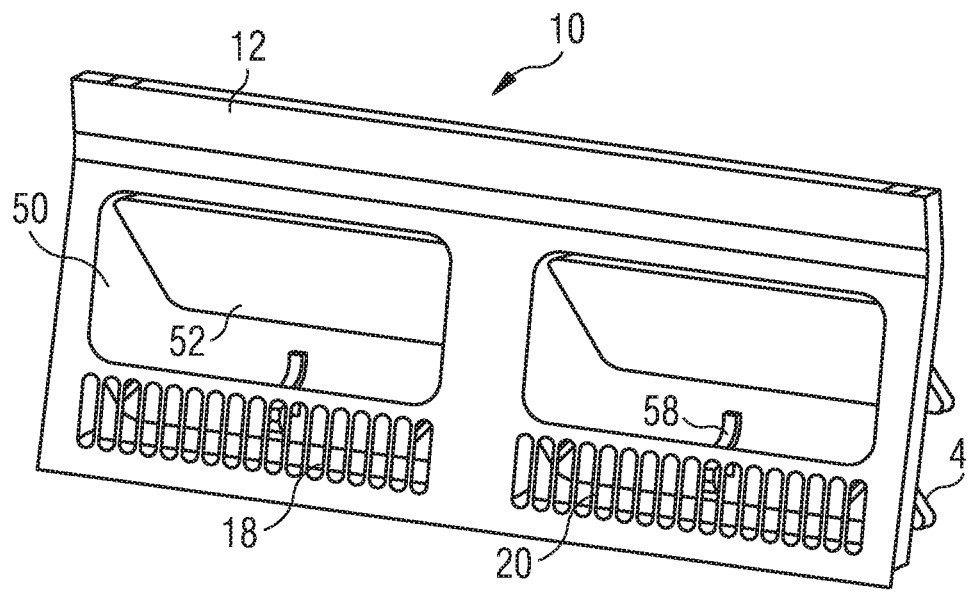
Figure 11:
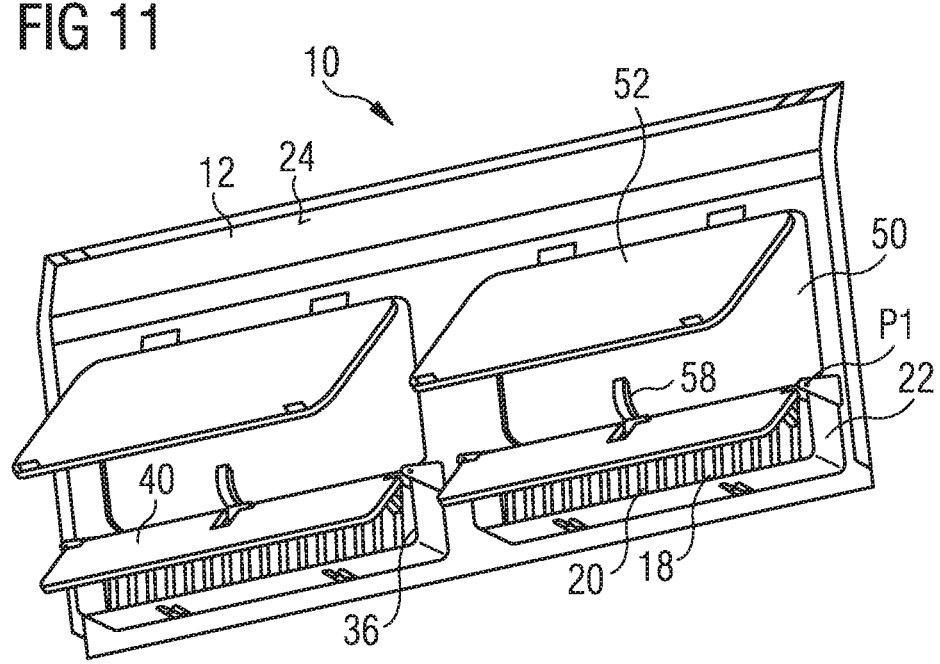

Further, the first decompression flap 40, during normal operation of the decompression assembly 10, is locked in its closed position by means of a first locking mechanism 44 which is depicted in greater detail in FIGS. 6 and 7. The first locking mechanism 44 comprises two locking elements 46 which are adapted to interact with the first decompression flap 40, in particular an edge of the first decompression flap 40 which faces the aircraft cabin floor 14, so as to lock the first decompression flap 40 in its closed position during normal operation of the decompression assembly 10. Each locking element 46 is provided with a snapping element 48 which is adapted to resiliently interact with the edge of the first decompression flap 40 so that the first locking mechanism 44 is designed in the form of a snap and click mechanism.

The first locking mechanism 44 is adapted to lock the first decompression flap 40 in its closed position until a pressure difference between the aircraft cabin region 26 delimited by the cabin lining element 12 and the aircraft area 30 located between the cabin lining element 12 and the aircraft outer skin 32 exceeds a rapid decompression threshold value. Thus, during normal operation of the decompression assembly 10, as long as the locking force provided by the first locking mechanism 44 exceeds a pressure difference between the aircraft cabin region 26 delimited by the cabin lining element 12 and the aircraft area 30 located between the cabin lining element 12 and the aircraft outer skin 32, which acts on opposing surfaces of the first decompression flap 40, the first decompression flap 40 is held in its closed position as shown in FIGS. 1 and 3 to 7.

The decompression assembly 10 also comprises a second decompression opening 50 which is formed in the cabin lining element 12. The second decompression opening 50 has a cross-sectional area which is larger than a cross-sectional area of the first decompression opening 36. Further, the second decompression opening 50 is formed in the region of the cabin lining element 12 which, when the cabin lining element 12 is mounted in an aircraft cabin, faces away from the cabin floor 14. To the contrary, the opening 18 is formed in the region of the cabin lining element 12 which, when the cabin lining element 12 is mounted in an aircraft cabin, faces the cabin floor 14.

A second decompression flap 52 is present which, during normal operation of the decompression assembly 10, closes the second decompression opening 50 formed in the cabin lining element 12 as shown in FIGS. 1 and 3 to 7. Thus, during normal operation of the decompression assembly 10, the air outlet 28 in fact is the only air flow path between the aircraft cabin region 26 delimited by the cabin lining element 12 and the aircraft area 30 located between the cabin lining element 12 and the aircraft outer skin 32. The second decompression flap 52 is pivotable about a second pivot axis P2 which is attached to the rear face 24 of the cabin lining element 12. A second locking mechanism 54 serves to lock the second decompression flap 52 in its closed position.

The second locking mechanism 54 comprises two locking elements 56. Each locking element 56 is designed in the form of a locking pin and is adapted to interact with the second decompression flap 52, in particular an edge of the second decompression flap 52 which faces the opening 18 formed in the cabin lining element 12, so as to lock the second decompression flap 52 in its closed position during normal operation of the decompression assembly 10. In particular, each locking element 56 is attached to the first decompression flap 40 and pivotable about the first pivot axis P1 together with the first decompression flap 40.

In the event of a rapid decompression, the first decompression flap 40 is adapted to open the first decompression opening 36 so as to allow a pressure equalization between the aircraft cabin region 26 delimited by the cabin lining element 12 and the aircraft area 30 located between the cabin lining element 12 and the aircraft outer skin 32. Further, also the second decompression flap 56 is adapted to open the second decompression opening 50 so as to allow a pressure equalization between the aircraft cabin region 26 delimited by the cabin lining element 12 and the aircraft area 30 located between the cabin lining element 12 and the aircraft outer skin 32.

Specifically, if in the event of a rapid decompression which is caused by a sudden pressure drop in the aircraft area 30 located between the cabin lining element 12 and the aircraft outer skin 32, a pressure difference between the aircraft area 30 located between the cabin lining element 12 and the aircraft outer skin 32 and the aircraft cabin region 26 delimited by the cabin lining element 12 exceeds a rapid decompression threshold value, the pressure difference acting on opposing side faces of the first decompression flap 40 exceeds the locking force which is applied to the first decompression flap 40 by the first locking mechanism 44. As a result, as shown in FIG. 8*a*, the first decompression flap 40 pivots about the first pivot axis P1 in a direction away from the rear face 24 of the cabin lining element 12 so as to open the first decompression opening 36 and to allow an air flow from the air channel 22 through the first decompression opening 36. Thus, air may flow from the aircraft cabin region 26 delimited by the cabin lining element 12 into the aircraft area 30 located between the cabin lining element 12 and the aircraft outer skin 32 via the opening 18 provided in the cabin lining element 12, the air channel 22 and the first decompression opening 36.

As the first decompression flap 40 is moved from its closed position into its open position, the locking elements 56 of the second locking mechanism 54 are disengaged from the second decompression flap 52 as shown in FIG. 8a. Thus, also the second decompression flap 52 is allowed to move from its closed position into its open position so as to release the second decompression opening 50 formed in the cabin lining element 12. As a result, air may flow from the aircraft cabin region 26 delimited by the cabin lining element 12 into the aircraft area 30 located between the cabin lining element 12 and the aircraft outer skin 32, not only via the opening 18 provided in the cabin lining element 12, the air channel 22 and the first decompression opening 36, but also via the second decompression opening 50 provided in the cabin lining element 12, in FIG. 8b. Hence, a rapid pressure equalization between the aircraft cabin region 26 delimited by the cabin lining element 12 and the aircraft area 30 located between the cabin lining element 12 and the aircraft outer skin 32 is made possible.

Figure 14:
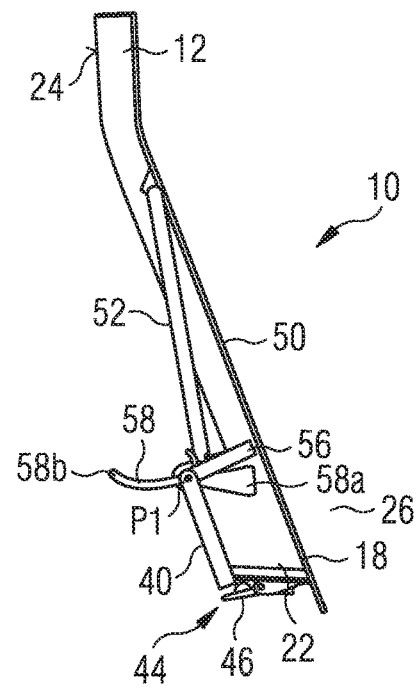
FIG. 14 shows the decompression assembly according to FIG. 8b after a rapid decompression event.

After a rapid decompression event, i.e., after pressure equalization between the aircraft cabin region 26 delimited by the cabin lining element 12 and the aircraft area 30 located between the cabin lining element 12 and the aircraft outer skin 32 has taken place and the pressure difference between the aircraft cabin region 26 delimited by the cabin lining element 12 and the aircraft area 30 located between the cabin lining element 12 and the aircraft outer skin 32 again is lower than the rapid decompression threshold value, the first decompression flap 40, is biased back into its closed position and back into engagement with the first locking mechanism 44 by means of the spring mechanism 42, see FIG. 14. Simultaneously, the second decompression flap 52 gravity driven assumes a position adjacent to the second decompression opening 50. The second decompression flap 52, however, still is not locked in its closed position.

In order to lock the second decompression flap 52 in its closed position after a rapid decompression event, a manual operation as shown in FIGS. 15a to e is required. In particular, the second locking mechanism 54 comprises a lever element 58 which is adapted to be brought into contact with the second decompression flap 52, after a rapid decompression event, by a manual operation so as to move the second decompression flap 52 back into its closed position and into engagement with the second locking mechanism 54.

The lever element 58 is pivotable about the first pivot axis P1 relative to the first decompression flap 40 and the locking elements 56 of the second locking mechanism 54. Further, the lever element 58 comprises a first portion 58a which, after a rapid decompression event, can be contacted with a tool 60 inserted into the air channel 22 through the opening 18 provided in the cabin lining element 12, see FIG. 15a. By means of the tool 60, the lever element 48 is pivoted about the first pivot axis P1 until a second portion 58b of the lever element 58 contacts the second decompression flap 52, see FIG. 15b and pushes the second decompression flap 52 towards the second decompression opening 50, see FIG. 15c. Finally, the second decompression flap 52, by means of the lever element 58 is pushed back into engagement with the locking elements 56 of the second locking mechanism 54, see FIG. 15d.

Figure 1:
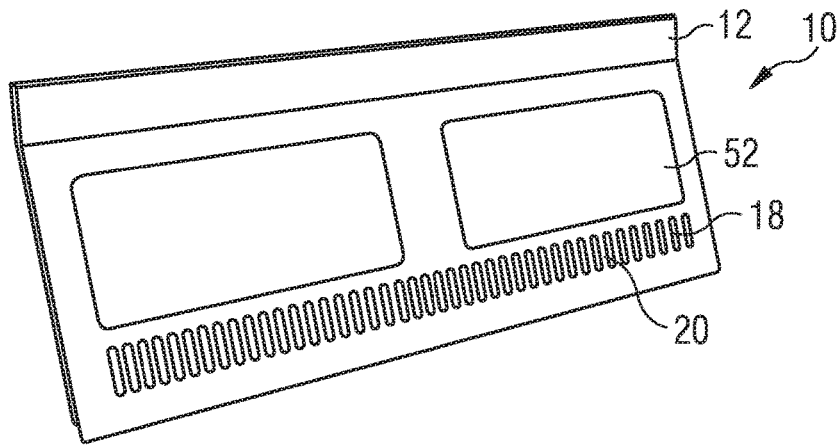
FIG. 1 shows a front view of a decompression assembly for use in an aircraft during normal operation of the decompression assembly.
Figure 2:
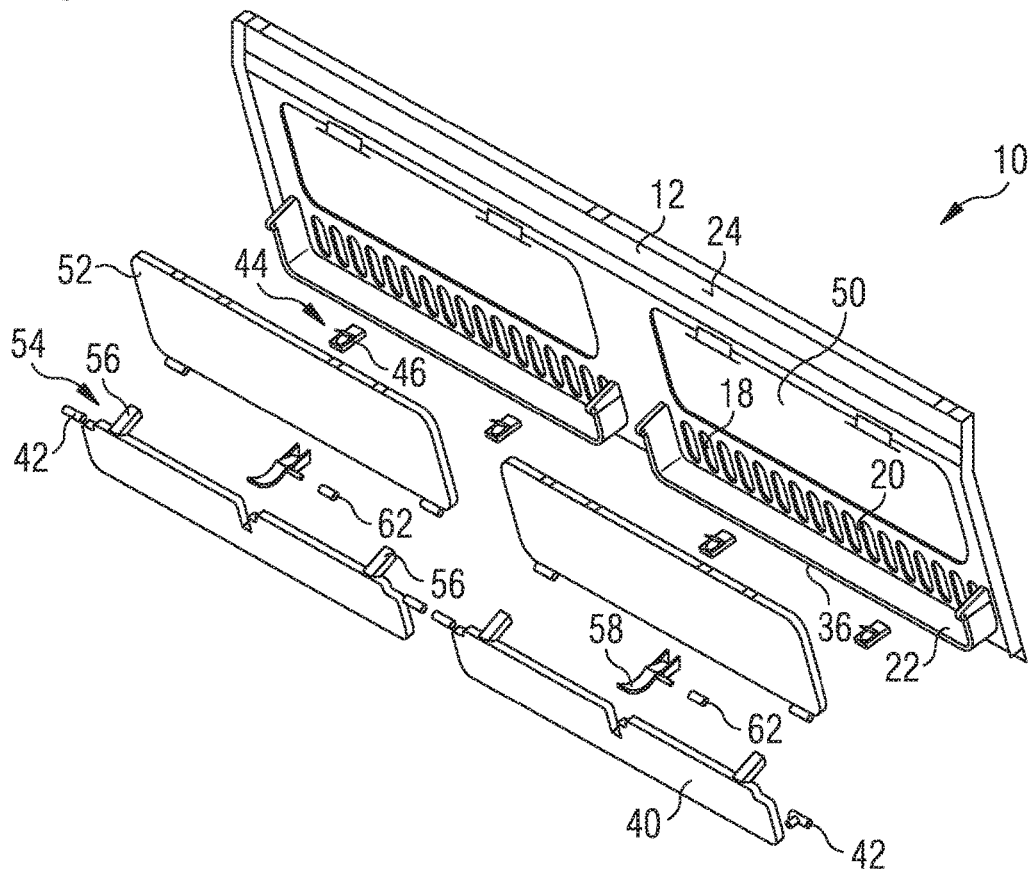
FIG. 2 shows an exploded view of the decompression assembly according to FIG. 1.

Finally, the lever element 58, by means of a spring element 62, see FIG. 2, is biased back into a position wherein its first portion 58a protrudes into the air channel 22 and hence, if necessary, can be reached by a tool 60 which is inserted into the air channel 22 through the opening 18 provided in the cabin lining element 12, whereas its second portion 58b again is arranged at a distance from the second decompression flap 52, see FIG. 15e.

In the embodiment of a decompression assembly 10 shown in the drawings, two openings 18 and two second decompression openings 50 are formed in the cabin lining element 12. Further, the decompression assembly 10 is provided with two first decompression flaps 40, two second decompression flaps 52, etc. It is, however, also conceivable to form only one opening 18 and only one second decompression opening 50 or a plurality of openings 18 and a plurality of second decompression openings 50 in the cabin lining element 12. Further, the decompression assembly may be provided with only one first decompression flap 40, only one second decompression flap 52, etc. or with a plurality of first decompression flaps 40, a plurality of second decompression flaps 52, etc.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A decompression assembly for use in an aircraft, the decompression assembly comprising:
    a cabin lining element,
    an opening formed in the cabin lining element,
    an air channel arranged adjacent to a rear face of the cabin lining element and connected to the opening formed in the cabin lining element,
    wherein the air channel is provided with
        an air outlet which, during normal operation of the decompression assembly, is adapted to discharge air exiting an aircraft cabin region delimited by the cabin lining element through the opening formed in the cabin lining element into an aircraft area located between the cabin lining element and an aircraft outer skin,
        a first decompression opening, and
        a first decompression flap which, during normal operation of the decompression assembly, is adapted to close the first decompression opening provided in the air channel and which, in the event of a rapid decompression, is adapted to open the first decompression opening so as to allow a pressure equalization between the aircraft cabin region delimited by the cabin lining element and the aircraft area located between the cabin lining element and the aircraft outer skin,
    a second decompression opening formed in the cabin lining element, and a second decompression flap which, during normal operation of the decompression assembly, is adapted to close the second decompression opening formed in the cabin lining element and which, in the event of a rapid decompression, is adapted to open the second decompression opening so as to allow a pressure equalization between the aircraft cabin region delimited by the cabin lining element and the aircraft area located between the cabin lining element and the aircraft outer skin, wherein the first decompression flap is biased into its closed position by means of a spring mechanism, and the first decompression flap, during normal operation of the decompression assembly, is locked in its closed position by means of a first locking mechanism, wherein the first locking mechanism is adapted to lock the first decompression flap in its closed position until a pressure difference between the aircraft cabin region delimited by the cabin lining element and the aircraft area located between the cabin lining element and the aircraft outer skin exceeds a rapid decompression threshold value, and wherein the spring mechanism is adapted to bias the first decompression flap, after a rapid decompression event, back into its closed position and back into engagement with the first locking mechanism as soon as the pressure difference between the aircraft cabin region delimited by the cabin lining element and the aircraft area located between the cabin lining element and the aircraft outer skin is lower than the rapid decompression threshold value.

2. The decompression assembly according to claim 1, wherein the air outlet is formed in a first wall of the air channel which has a first edge facing the rear face of the cabin lining element and a second edge facing away from the rear face of the cabin lining element.

3. The decompression assembly according to claim 1, wherein at least one of the opening formed in the cabin lining element and the air outlet formed in the air channel is covered by an air permeable grid.

4. The decompression assembly according to claim 1, wherein the first decompression opening is formed in a second wall of the air channel which extends at a distance from the rear face of the cabin lining element opposed to the opening formed in the cabin lining element.

5. The decompression assembly according to claim 1, wherein the first decompression flap is pivotable about a first pivot axis and, in the event of a rapid decompression, is adapted to pivot in a direction away from the rear face of the cabin lining element so as to allow an airflow from the air channel through the first decompression opening into the aircraft area located between the cabin lining element and the aircraft outer skin.

6. The decompression assembly according to claim 1, wherein the second decompression opening is formed in a region of the cabin lining element which, when the cabin lining element is mounted in an aircraft cabin, faces away from a floor of the aircraft cabin, and wherein the opening is formed in a region of the cabin lining element which, when the cabin lining element is mounted in an aircraft cabin, faces the floor of the aircraft cabin.

7. The decompression assembly according to claim 1, wherein a cross-sectional area of the second decompression opening is larger than a cross-sectional area of the first decompression opening.

8. The decompression assembly according to claim 1, wherein the second decompression flap is pivotable about a second pivot axis and, in the event of a rapid decompression, is adapted to pivot in a direction away from the rear face of the cabin lining element so as to allow an airflow from the aircraft cabin region delimited by the cabin lining element through the second decompression opening into the aircraft area located between the cabin lining element and the aircraft outer skin.

9. The decompression assembly according to claim 8, wherein the second pivot axis of the second decompression flap is attached to the rear face of the cabin lining element.

10. The decompression assembly according to claim 8, wherein the second decompression flap, during normal operation of the decompression assembly, is locked in its closed position by means of a second locking mechanism.

11. The decompression assembly according to claim 10, wherein the second locking mechanism further comprises a lever element which is adapted to be brought into contact with the second decompression flap, after a rapid decompression event, by a manual operation so as to move the second decompression flap back into its closed position and into engagement with the second locking mechanism.

12. The decompression assembly according to claim 1, wherein the cabin lining element is a dado panel.

13. A decompression assembly for use in an aircraft, the decompression assembly comprising:
a cabin lining element,
an opening formed in the cabin lining element,
an air channel arranged adjacent to a rear face of the cabin lining element and connected to the opening formed in the cabin lining element,
wherein the air channel is provided with
an air outlet which, during normal operation of the decompression assembly, is adapted to discharge air exiting an aircraft cabin region delimited by the cabin lining element through the opening formed in the cabin lining element into an aircraft area located between the cabin lining element and an aircraft outer skin,
a first decompression opening, and
a first decompression flap which, during normal operation of the decompression assembly, is adapted to close the first decompression opening provided in the air channel and which, in the event of a rapid decompression, is adapted to open the first decompression opening so as to allow a pressure equalization between the aircraft cabin region delimited by the cabin lining element and the aircraft area located between the cabin lining element and the aircraft outer skin,
a second decompression opening formed in the cabin lining element, and
a second decompression flap which, during normal operation of the decompression assembly, is adapted to close the second decompression opening formed in the cabin lining element and which, in the event of a rapid decompression, is adapted to open the second decompression opening so as to allow a pressure equalization between the aircraft cabin region delimited by the cabin lining element and the aircraft area located between the cabin lining element and the aircraft outer skin,
wherein the first decompression flap is pivotable about a first pivot axis and, in the event of a rapid decompression, is adapted to pivot in a direction away from the rear face of the cabin lining element so as to allow an airflow from the air channel through the first decompression opening into the aircraft area located between the cabin lining element and the aircraft outer skin, and wherein the first pivot axis of the first decompression flap is arranged along an edge of the first decompression flap which faces the air outlet.

14. A decompression assembly for use in an aircraft, the decompression assembly comprising:
   a cabin lining element,
   an opening formed in the cabin lining element,
   an air channel arranged adjacent to a rear face of the cabin lining element and connected to the opening formed in the cabin lining element,
   wherein the air channel is provided with
      an air outlet which, during normal operation of the decompression assembly, is adapted to discharge air exiting an aircraft cabin region delimited by the cabin lining element through the opening formed in the cabin lining element into an aircraft area located between the cabin lining element and an aircraft outer skin,
      a first decompression opening, and
      a first decompression flap which, during normal operation of the decompression assembly, is adapted to close the first decompression opening provided in the air channel and which, in the event of a rapid decompression, is adapted to open the first decompression opening so as to allow a pressure equalization between the aircraft cabin region delimited by the cabin lining element and the aircraft area located between the cabin lining element and the aircraft outer skin,
   a second decompression opening formed in the cabin lining element, and
   a second decompression flap which, during normal operation of the decompression assembly, is adapted to close the second decompression opening formed in the cabin lining element and which, in the event of a rapid decompression, is adapted to open the second decompression opening so as to allow a pressure equalization between the aircraft cabin region delimited by the cabin lining element and the aircraft area located between the cabin lining element and the aircraft outer skin,
   wherein the second decompression flap is pivotable about a second pivot axis and, in the event of a rapid decompression, is adapted to pivot in a direction away from the rear face of the cabin lining element so as to allow an airflow from the aircraft cabin region delimited by the cabin lining element through the second decompression opening into the aircraft area located between the cabin lining element and the aircraft outer skin,
   wherein the second decompression flap, during normal operation of the decompression assembly, is locked in its closed position by means of a second locking mechanism, and
   wherein at least one locking element of the second locking mechanism is attached to the first decompression flap and pivotable about the first pivot axis together with the first decompression flap.

15. An aircraft comprising a decompression assembly comprising:
   a cabin lining element,
   an opening formed in the cabin lining element,
   an air channel arranged adjacent to a rear face of the cabin lining element and connected to the opening formed in the cabin lining element,
   wherein the air channel is provided with
      an air outlet which, during normal operation of the decompression assembly, is adapted to discharge air exiting an aircraft cabin region delimited by the cabin lining element through the opening formed in the cabin lining element into an aircraft area located between the cabin lining element and an aircraft outer skin,
      a first decompression opening, and
      a first decompression flap which, during normal operation of the decompression assembly, is adapted to close the first decompression opening provided in the air channel and which, in the event of a rapid decompression, is adapted to open the first decompression opening so as to allow a pressure equalization between the aircraft cabin region delimited by the cabin lining element and the aircraft area located between the cabin lining element and the aircraft outer skin,
   a second decompression opening formed in the cabin lining element, and
   a second decompression flap which, during normal operation of the decompression assembly, is adapted to close the second decompression opening formed in the cabin lining element and which, in the event of a rapid decompression, is adapted to open the second decompression opening so as to allow a pressure equalization between the aircraft cabin region delimited by the cabin lining element and the aircraft area located between the cabin lining element and the aircraft outer skin,
   wherein the first decompression flap is biased into its closed position by means of a spring mechanism, and the first decompression flap, during normal operation of the decompression assembly, is locked in its closed position by means of a first locking mechanism, wherein the first locking mechanism is adapted to lock the first decompression flap in its closed position until a pressure difference between the aircraft cabin region delimited by the cabin lining element and the aircraft area located between the cabin lining element and the aircraft outer skin exceeds a rapid decompression threshold value, and
   wherein the spring mechanism is adapted to bias the first decompression flap, after a rapid decompression event, back into its closed position and back into engagement with the first locking mechanism as soon as the pressure difference between the aircraft cabin region delimited by the cabin lining element and the aircraft area located between the cabin lining element and the aircraft outer skin is lower than the rapid decompression threshold value.

* * * * *